(12) United States Patent
Guddeti

(10) Patent No.: US 10,210,120 B2
(45) Date of Patent: Feb. 19, 2019

(54) METHOD, APPARATUS AND SYSTEM TO IMPLEMENT SECONDARY BUS FUNCTIONALITY VIA A RECONFIGURABLE VIRTUAL SWITCH

(71) Applicant: Intel Corporation, Santa Clara, CA (US)

(72) Inventor: Jayakrishna Guddeti, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 14/669,256

(22) Filed: Mar. 26, 2015

(65) Prior Publication Data

US 2016/0283428 A1    Sep. 29, 2016

(51) Int. Cl.
   *H05K 7/10*        (2006.01)
   *G06F 13/40*       (2006.01)

(52) U.S. Cl.
   CPC ...... *G06F 13/4022* (2013.01); *G06F 13/4027* (2013.01)

(58) Field of Classification Search
   CPC .......................... G06F 13/4027; G06F 13/4022
   USPC ........................................................ 710/301
   See application file for complete search history.

(56) References Cited

U.S. PATENT DOCUMENTS

| | | |
|---|---|---|
| 7,752,376 B1 | 7/2010 | Johnsen et al. |
| 7,873,068 B2 | 1/2011 | Klinglesmith et al. |
| 8,170,062 B2 | 5/2012 | Wagh et al. |
| 8,711,875 B2 | 4/2014 | Lakshmanamurthy et al. |
| 8,713,234 B2 | 4/2014 | Lakshmanamurthy et al. |
| 8,713,240 B2 | 4/2014 | Lakshmanamurthy et al. |
| 8,775,700 B2 | 7/2014 | Lakshmanamurthy et al. |
| 8,805,926 B2 | 8/2014 | Lakshmanamurthy et al. |
| 8,874,976 B2 | 10/2014 | Lakshmanamurthy et al. |
| 2006/0206655 A1 | 9/2006 | Chappell et al. |

(Continued)

OTHER PUBLICATIONS

U.S. Appl. No. 14/573,738, filed Dec. 17, 2014, entitled "Method, Apparatus and System for Integrating Devices in a Root Complex," by Jayakrishna Guddeti.

(Continued)

*Primary Examiner* — Chun Kuan Lee
(74) *Attorney, Agent, or Firm* — Trop, Pruner & Hu, P.C.

(57) ABSTRACT

In an embodiment, an apparatus includes: a fabric of a first communication protocol to communicate with an upstream agent in an upstream direction and to communicate with a plurality of downstream agents in a downstream direction; a switch coupled between the fabric and at least some of the plurality of downstream agents, the switch to couple to a primary interface of the fabric via a primary interface of the switch and to communicate with the fabric via the first communication protocol, the switch further including a sideband interface to interface with a sideband fabric of the first communication protocol; and the at least some downstream agents coupled to the switch via the sideband fabric, wherein the at least some downstream agents are to be enumerated with a secondary bus of a second communication protocol, and the switch device is to provide a transaction received from the upstream agent to a first downstream agent based on a bus identifier of the secondary bus with which the first downstream agent is enumerated. Other embodiments are described and claimed.

21 Claims, 11 Drawing Sheets

(56) References Cited

U.S. PATENT DOCUMENTS

| | | |
|---|---|---|
| 2009/0164694 A1 | 6/2009 | Talayco et al. |
| 2011/0113083 A1 | 5/2011 | Shahar |
| 2013/0054845 A1 | 2/2013 | Lakshmanamurthy et al. |
| 2013/0054856 A1 | 2/2013 | Lakshmanamurthy et al. |
| 2013/0083798 A1 | 4/2013 | Lakshmanamurthy et al. |
| 2013/0138858 A1 | 5/2013 | Lakshmanamurthy et al. |
| 2014/0052889 A1 | 2/2014 | Klinglesmith et al. |
| 2014/0258492 A1 | 9/2014 | Lakshmanamurthy et al. |
| 2014/0258578 A1 | 9/2014 | Lakshmanamurthy et al. |
| 2014/0258583 A1 | 9/2014 | Lakshmanamurthy et al. |
| 2014/0289435 A1 | 9/2014 | Lakshmanamurthy et al. |
| 2016/0077841 A1* | 3/2016 | Lambert ............... G06F 9/4411 713/2 |

OTHER PUBLICATIONS

International Searching Authority, "Notification of Transmittal of the International Search Report and the Written Opinion of the International Searching Authority," dated Jul. 8, 2016 in International application No. PCT/US2016/020046.

\* cited by examiner

METHOD, APPARATUS AND SYSTEM TO IMPLEMENT SECONDARY BUS FUNCTIONALITY VIA A RECONFIGURABLE VIRTUAL SWITCH

TECHNICAL FIELD

Embodiments relate to communications in semiconductor devices.

BACKGROUND

Multiple logic blocks can be incorporated into a single integrated circuit, often on a single semiconductor die. In some designs, the topology of an on-chip fabric interconnect and various device positions may be predefined for a variety of reasons, including for bandwidth, floor plan, physical timing, and so on.

Introducing additional layers in a topology to incorporate root port or switch port modules can cause disruption in chip layout and resynthesizing the design for each product, increasing effort and turnaround time. Introducing additional stages in a fabric hierarchy also can impact latency/performance due to additional staging in transaction processing. In another scenario, there may be a desire to have different versions of an acceleration complex, one for on-chip integration and another for an off-chip form factor. Existing approaches cannot support this type of reuse of synthesized design sections, because of drastic changes in a given fabric hierarchy to support different variations.

DETAILED DESCRIPTION

In various embodiments a single switch module may be incorporated into an integrated circuit (IC) such as a system on chip (SoC) or other processor. This switch module is in accordance with a given communication protocol, which in an embodiment is compliant with a Peripheral Component Interconnect Express (PCIe) specification such as the PCIe Base Specification revision 3.0 (dated Nov. 10, 2010) or another available or future version. As used herein, this switch is referred to as a virtual switch since it is configured to perform PCIe switching operations for multiple devices to which it is connected.

In the embodiments described herein, understand that the various on-chip components may communicate via another communication protocol, e.g., via an on-chip fabric protocol. As an example the components may communicate according to a given communication protocol such as an integrated on-chip system fabric (IOSF) specification issued by a semiconductor manufacturer or designer to provide a standardized on-die interconnect protocol for attaching intellectual property (IP) blocks or logic ("block" and "logic" are used interchangeably herein) within a chip such as a SoC. Note that in different embodiments, such IP blocks can be of varying types, including general-purpose processors such as in-order or out-of-order cores, fixed function units, graphics processors, input/output (IO) controllers, display controllers, media processors among many others. Note that many different types IP agents can be integrated in different types of chips. Accordingly, not only can the semiconductor manufacturer efficiently design different types of chips across a wide variety of customer segments, it can also, via the specification, enable third parties to design logic such as IP agents to be incorporated in such chips. And furthermore, by providing multiple options for many facets of the interconnect protocol, reuse of designs is efficiently accommodated.

Figure 1:
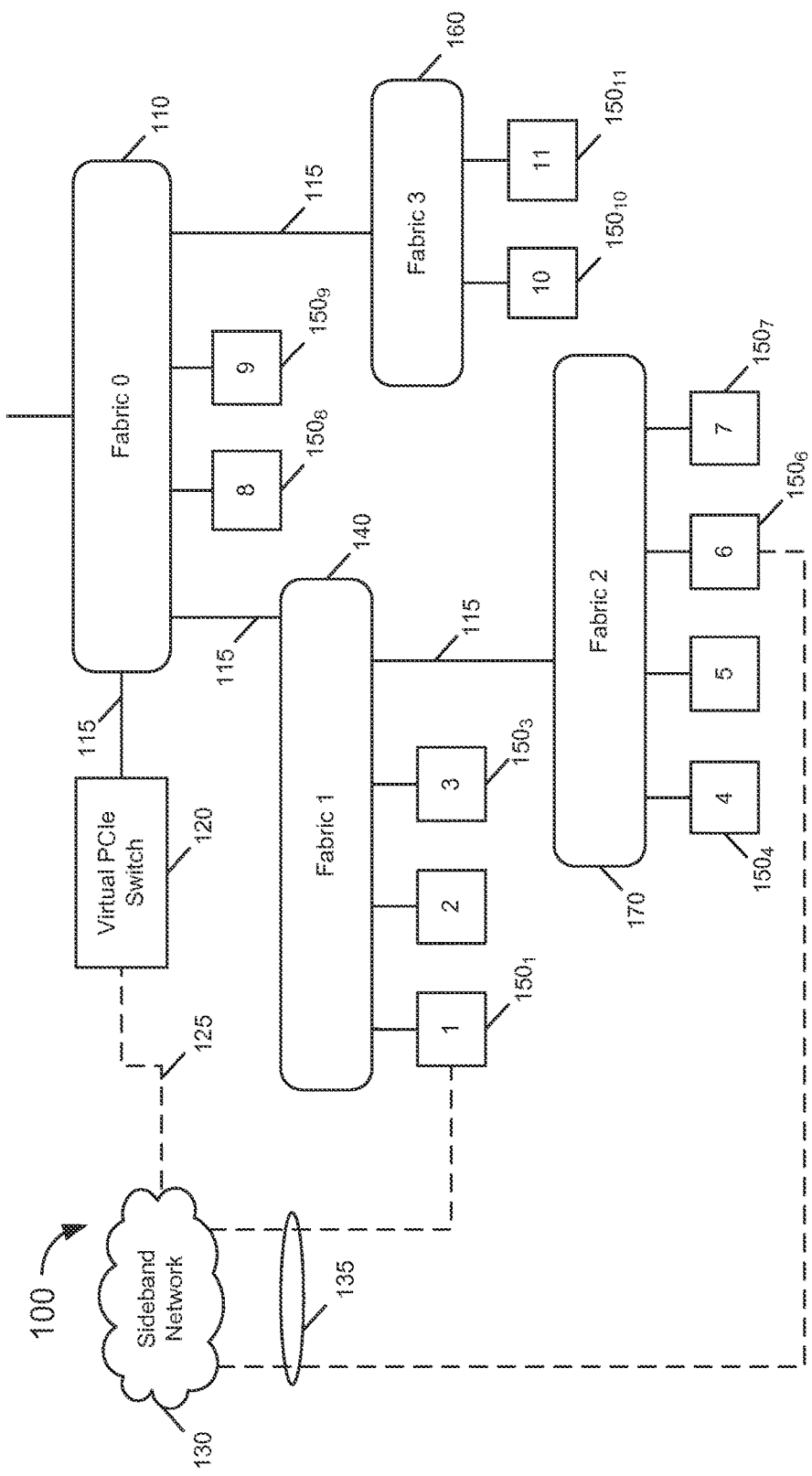
FIG. 1 is a block diagram of an apparatus in accordance with an embodiment of the present invention.

Referring now to FIG. 1, shown is a block diagram of an apparatus 100 in accordance with an embodiment of the present invention. As shown in FIG. 1, apparatus 100 may take different forms in different implementations. For example, apparatus 100 may be a SoC implemented on a single semiconductor die. In other cases, apparatus 100 is a separate semiconductor die of a multichip module. In still further cases, apparatus 100 may be implemented as an add-in card, e.g., having an accelerator complex to provide efficient operations for particular specialized functionality (examples include networking, video processing or so forth).

In any case, apparatus 100 provides a multi-hierarchical fabric topology. In the embodiment shown, a plurality of fabrics 110, 140, 160 and 170 are present, each at a corresponding hierarchical level. In an embodiment, each fabric (generically "110x," herein with "110" used to refer specifically to the top level fabric 110) may be implemented as an IOSF fabric. Further, using an embodiment of the present invention, a single fabric design may be used for all of these fabric instantiations 110x such that the design complexity for customizing each fabric for a particular connection can be avoided. In an embodiment, fabrics 110x at different levels of the hierarchy shadow PCIe base address registers (BARs) of corresponding devices under that particular fabric. Different levels of fabric 110x use these BAR registers to decode incoming addresses and route to corresponding devices 150.

As further illustrated in FIG. 1, top level fabric 110 is coupled via a first interconnect 115 to a virtual PCIe switch 120. In the embodiment shown, interconnect 115 is an IOSF primary interconnect that couples to corresponding primary interfaces within fabric 110 and PCIe switch 120. As described further herein, virtual PCIe switch 120 (also referred to as PCIe switch) may perform PCIe switching operations and control functionality for a plurality of devices that couple to virtual PCI switch 120 via a sideband network 130, which in an embodiment may be an IOSF sideband network. Thus as seen, virtual PCIe switch 120 couples to sideband network 130 via a first sideband interconnect 125 (an IOSF sideband interconnect). Still further, sideband network 130 couples to a plurality of devices via corresponding sideband interconnects 135 (additional IOSF sideband interconnects).

In the illustration of FIG. 1, a plurality of devices $150_1$-$150_{11}$ is present. Each such device 150 may be a given intellectual property (IP) logic implemented within the semiconductor die or add-in card. In different implementations, a variety of different IP logics may be provided, from special-purpose accelerators to networking devices and so forth. In some embodiments, one or more of devices 150 may be of a third party to a designer of apparatus 100. In the case of a semiconductor die, the third party may be an independent entity from a semiconductor designer, licensor and/or manufacturer. In the context of an add-in card, one or more of these devices may be of an independent entity from a designer and/or manufacturer of the add-in card.

As shown in FIG. 1, PCIe switch 120 is implemented to interface only with those devices 150 that are to be configured on a secondary bus (irrespective of their physical position in a physical topology). In various embodiments, virtual PCIe switch 120 is a reconfigurable monolithic logic block to support secondary buses for multiple devices, without disturbing an underlying fabric physical topology. Virtual PCIe switch 120 interacts with both a primary interface (via interconnect 115) and a sideband interface (via sideband interconnect 125), to handle different type of transactions from/to devices.

In an embodiment, virtual PCIe switch 120 implements various functionalities, including: configuration space for the switch's upstream and downstream ports; routing for configuration accesses using source decoding; subtractive decode for non-implemented PCIe buses and address ranges; handling broadcast messages on a sideband interconnect; legacy interrupt support on the sideband interconnect; error logging and reporting as per PCIe switch rules; reset and power management handling for secondary buses; and optional PCIe root port configuration space, in the case of on-chip integration.

Embodiments enable reusability of synthesized circuit blocks, including fabrics and devices coupled to such fabrics, across different variations of products without redesign efforts for incorporating these circuit blocks in different products. In this way, chip designers can deliver multiple product variations, both on-chip and off-chip in short time frames. Further, this reuse is realized in designs including devices having multiple functions and single root I/O virtualization (SRIOV) scenarios, without altering a standard communication fabric. Embodiments described herein enable one or more devices integrated within a given SoC or other processor to support SRIOV. In the case of an off-chip acceleration complex, the PCIe switch may be implemented for each device in the acceleration complex, whereas an on-chip complex may implement a secondary bus only for limited devices (based on SRIOV support, number of functions). Such SRIOV devices can be enumerated with a large number of virtual functions by allocation of non-zero bus numbers to these devices.

Instead any product specific modifications are incorporated within the virtual PCIe switch. Devices $150_1$ and $150_6$ (shown as being coupled by sideband interconnects 135 to sideband network 130 and in turn to virtual PCIe switch 120) may perform multiple functions according to SRIOV mechanisms. To this end, such devices 150 may couple to virtual PCIe switch 120 to leverage the capabilities of this switch, thus avoiding the need for separate dedicated PCIe switches for these devices.

Understand that devices $150_1$ and $150_6$ may be enumerated with secondary buses to support the multiple functions of the devices. Note that in the embodiment of FIG. 1, the other devices 150 (i.e., other than devices $150_1$ and $150_6$) do not have the need for such secondary bus functionality and thus are not coupled to virtual PCIe switch 120. Note that in other cases, most or all devices 150 may implement secondary buses, especially in case of an off-chip acceleration complex. However in typical cases these other devices 150 still may couple to sideband network 130 (although the physical connections are not shown for ease of illustration in FIG. 1) to enable communications of various sideband information throughout apparatus 100. Understand while shown at this high level in the embodiment of FIG. 1, many variations and alternatives are possible.

Figure 2:
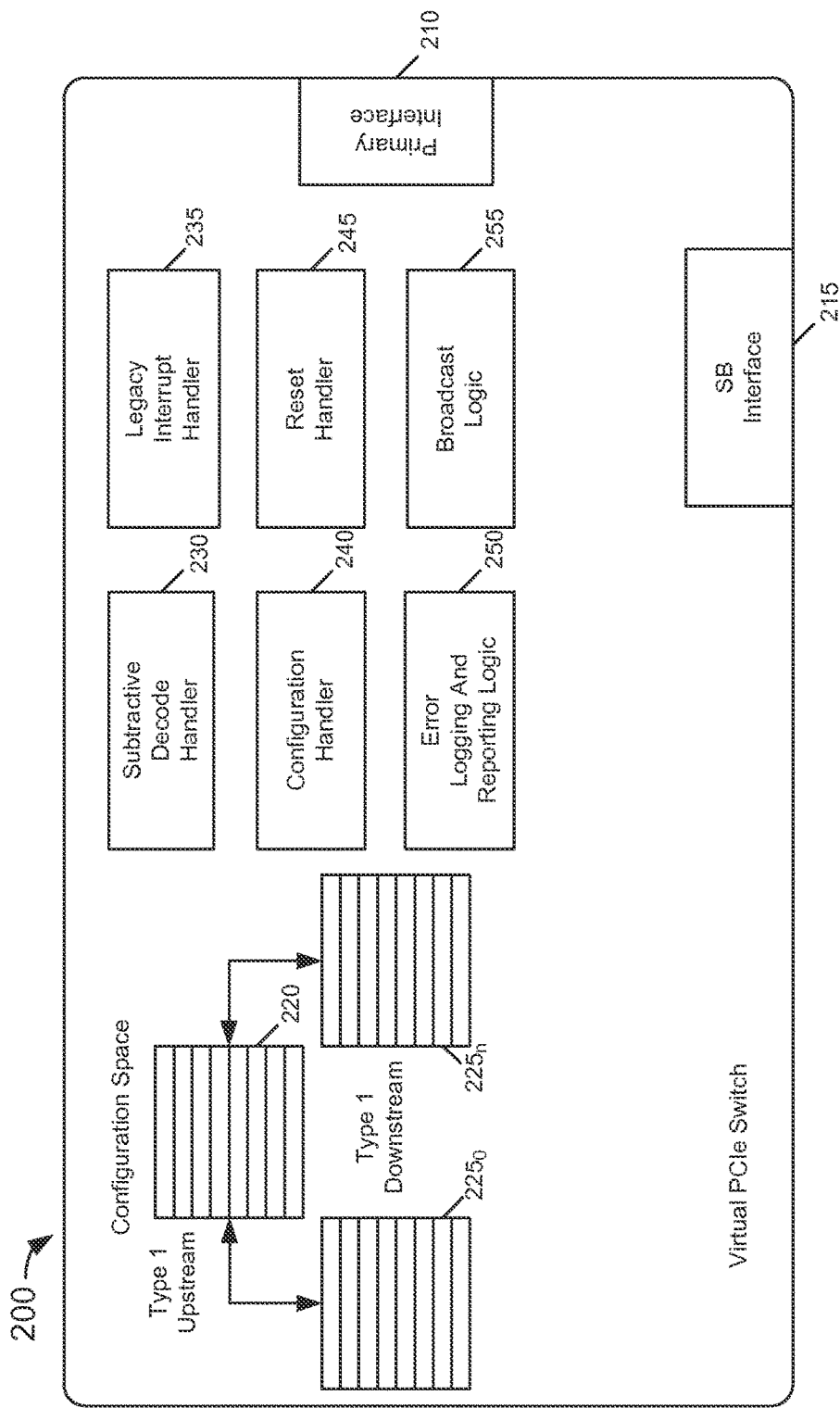
FIG. 2 is a block diagram of a virtual switch in accordance with an embodiment of the present invention.

Referring now to FIG. 2, shown is a block diagram of a virtual PCIe switch in accordance with an embodiment of the present invention. As shown in FIG. 2, PCIe switch 200 provides for interconnection between a top level fabric via a primary interface 210, which in an embodiment is an IOSF primary interface. Still further, a sideband interface 215 (e.g., an IOSF sideband interface) provides for interconnection to a sideband network such as IOSF sideband network 135 of FIG. 1. An IOSF communication protocol supports "Agent" and "Fabric" types of primary interfaces, where pairs of such interfaces interact with each other. In the context of FIG. 1, virtual PCIe switch 120 presents itself as an "Agent" interface and connects to a "Fabric" interface on fabric 110. Sideband interface 215 couples to the IOSF sideband fabric, which is a router-based fabric, such that any device can communicate with any other device using sideband Port-IDs. And thus different devices can send and receive transactions from virtual PCIe switch 120 via corresponding sideband interfaces. In an embodiment, fabric 110 and devices 150 may be aware of the presence of virtual PCIe switch 120 on the sideband fabric, to enable maximum reuse of design across different product variations.

As further illustrated in FIG. 2, virtual PCI switch 200 includes a configuration space. This configuration space may be compliant with a given PCIe specification. In the embodiment shown, the configuration space includes an upstream configuration space 220, which may be a Type 1 configuration space having a plurality of configuration registers for storage of configuration information associated with a Type 1 upstream device. In turn, one or more downstream configuration spaces $225_0$-$225_n$ may be present, where each such downstream configuration space 225 is associated with a given device to which virtual PCIe switch 200 couples via a sideband network. Thus with reference back to FIG. 1, two downstream configuration spaces 225 may be present, one associated with device $150_1$ and one associated with device $150_6$. Note that to add or remove devices from association with switch 120, the corresponding downstream configuration space may be added or removed. Various operations with regard to this configuration space will be discussed further below.

Virtual PCIe switch 200 further includes various logic to perform PCIe-based functionality. In the embodiment shown, virtual PCIe switch 200 includes a subtractive decode handler 230 to perform subtractive decode operations, as described herein. Via subtractive decode handler 230, virtual PCIe switch 120 receives and handles transactions targeted to an address space which is allocated in the switch upstream configuration and not claimed by any downstream port configuration space. In another implementation, there can be another agent which can be a subtractive agent.

Legacy interrupt handler 235 is configured to perform legacy interrupt handling for incoming legacy interrupts received, e.g., from downstream devices. A configuration handler 240 is configured to perform configuration operations, e.g., as received from an upstream agent and to complete configuration operations and provide a configuration completion received from a downstream device. A reset handler 245 is configured to perform reset operations within the virtual PCIe switch when a system including the switch is reset.

In addition, virtual PCIe switch 200 includes an error logging and reporting logic 250. In an embodiment, logic 250 may include a set of registers or other storages to store error reporting information and status information and perform a logging of errors into such storages. In addition, logic 250 may be configured to filter error information and/or to communicate error messages to appropriate entities. A broadcast logic 255 is configured to receive incoming broadcast messages, e.g., from an upstream agent and selectively forward such messages to one or more downstream devices coupled to virtual PCIe switch 200. Understand while shown at this high level in the embodiment of FIG. 2 and with these limited components and other logic, it is possible for a virtual PCIe switch in accordance with an embodiment to include additional and/or different components and logic.

Configuration handler 240 may be configured to handle configuration requests re-directed to virtual PCIe switch 120, from fabric 110. Handler 240 performs a look up of the downstream port's secondary and subordinate bus numbers to determine the destination device for a particular configuration transaction. It also allocates buffer space for incoming configuration transactions and corresponding completions received from downstream devices before forwarding upstream. Configuration handler 240 also maintains ordering between transactions, within each stream corresponding to each device.

In case a particular configuration transaction's bus is not owned by any downstream port, the transaction is sent to subtractive decode handler 230, which may generate a master abort. Subtractive decode handler 230 is configured to receive transactions that are unclaimed by any downstream ports and respond with an unsupported request for non-posted transactions or drop the transaction if it is a posted type.

Error logging and reporting logic 250 is configured to perform Advanced Error Reporting (AER) reporting per device in the downstream port's configuration space and upstream port. The errors detected in any of the fabrics report the error via the sideband fabric to this logic. Logic 250 is configured to log the PCIe transaction layer protocol (TLP) header which had an error.

Legacy interrupt handler 235 is configured to perform interrupt swizzling, to map a device's interrupt to an upstream interrupt. To this end, handler 235 uses a device identifier of the interrupt generating device and corresponding port number to access a swizzling table and map to a target INTx.

Broadcast logic 255 is configured to handle broadcast messages, by looking up downstream configuration settings to determine the devices that can receive a particular broadcast message and send to each device on sideband interface.

Reset handler 245 may be configured to operate during enumeration to ensure that system software (e.g., BIOS and/or operating system) can interact with the different devices and interfaces. This includes link initialization, link status, and credit initialization and so on. Reset handler 245 also implements functionality to support PCIe secondary bus reset, link disable, Advanced Configuration and Power Interface (ACPI)-defined device low power states) and so on. In order to support source validation, the bus map is shadowed in respective IOSF fabric ports, which may be performed by Virtual PCIe switch 120 using the sideband interface, at the time of PCIe enumeration.

Figure 3:
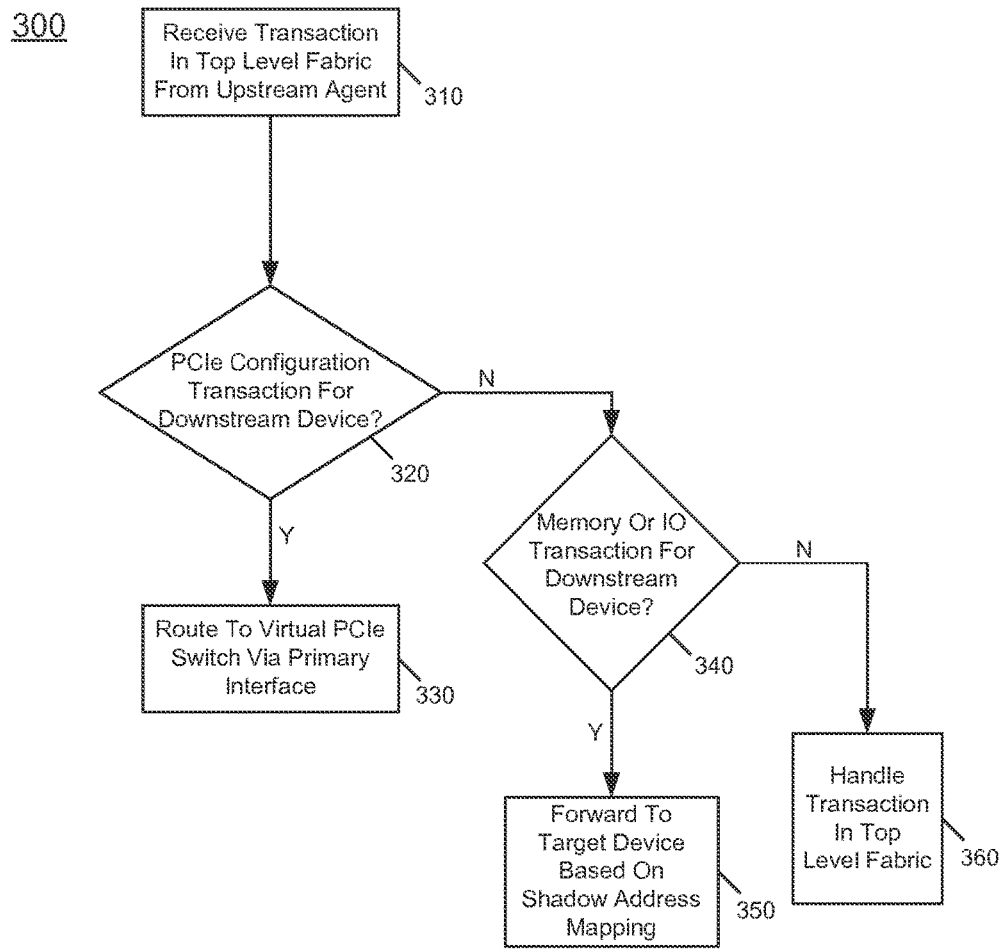
FIG. 3 is a flow diagram of a method in accordance with an embodiment of the present invention.

Referring now to FIG. 3, shown is a flow diagram of a method in accordance with an embodiment of the present invention. As shown in FIG. 3, method 300 may be performed within logic of a top level fabric that receives incoming transactions from one or more upstream agents. Although the scope of the present invention is not limited in this regard, such upstream agents may be cores or other primary logic of a processor complex, accelerator complex or so forth. As seen, method 300 begins by receiving a transaction in the top level fabric from an upstream agent (block 310). Next, it can be determined whether the incoming transaction is a PCIe configuration transaction for a downstream agent (diamond 320). In an embodiment, such determination may be based on a header that includes command or other information to indicate the presence of such configuration transaction. If so, control passes to block 330 where the transaction can be routed to a virtual PCIe switch. More specifically, this transaction may be communicated via a primary interface of the top level fabric which in turn is coupled to a corresponding primary interface of the virtual PCIe switch coupled to the fabric via a primary interconnect (which may be an IOSF interconnect). Understand from there, the virtual PCIe switch may handle the transaction appropriately, as described further herein.

Still with reference to FIG. 3, if instead the transaction is determined to not be a configuration transaction, control next passes to diamond 340 to determine whether the incoming transaction is a memory or I/O transaction destined for a downstream device. If so, control passes to block 350 where the transaction is forwarded to the target device. In an embodiment, the identification of the target device and appropriate addressing may be based on a shadow address mapping present in the top level fabric. Thus transactions such as memory or IO transactions can be communicated to a given downstream agent either directly coupled to the top level fabric (via corresponding primary interfaces and a primary interconnect), or via one or more hierarchies of fabrics coupled between the top level fabric and the target device.

Otherwise, if it is determined that the transaction is not directed to a downstream device, control passes from diamond 340 to block 360 where the transaction may be handled in the top level fabric. For example, the transaction may include control information to appropriately configure the top level fabric or it may include data to be consumed within the top level fabric. Understand while shown at this high level in the embodiment of FIG. 3, many variations and alternatives are possible.

Figure 4:
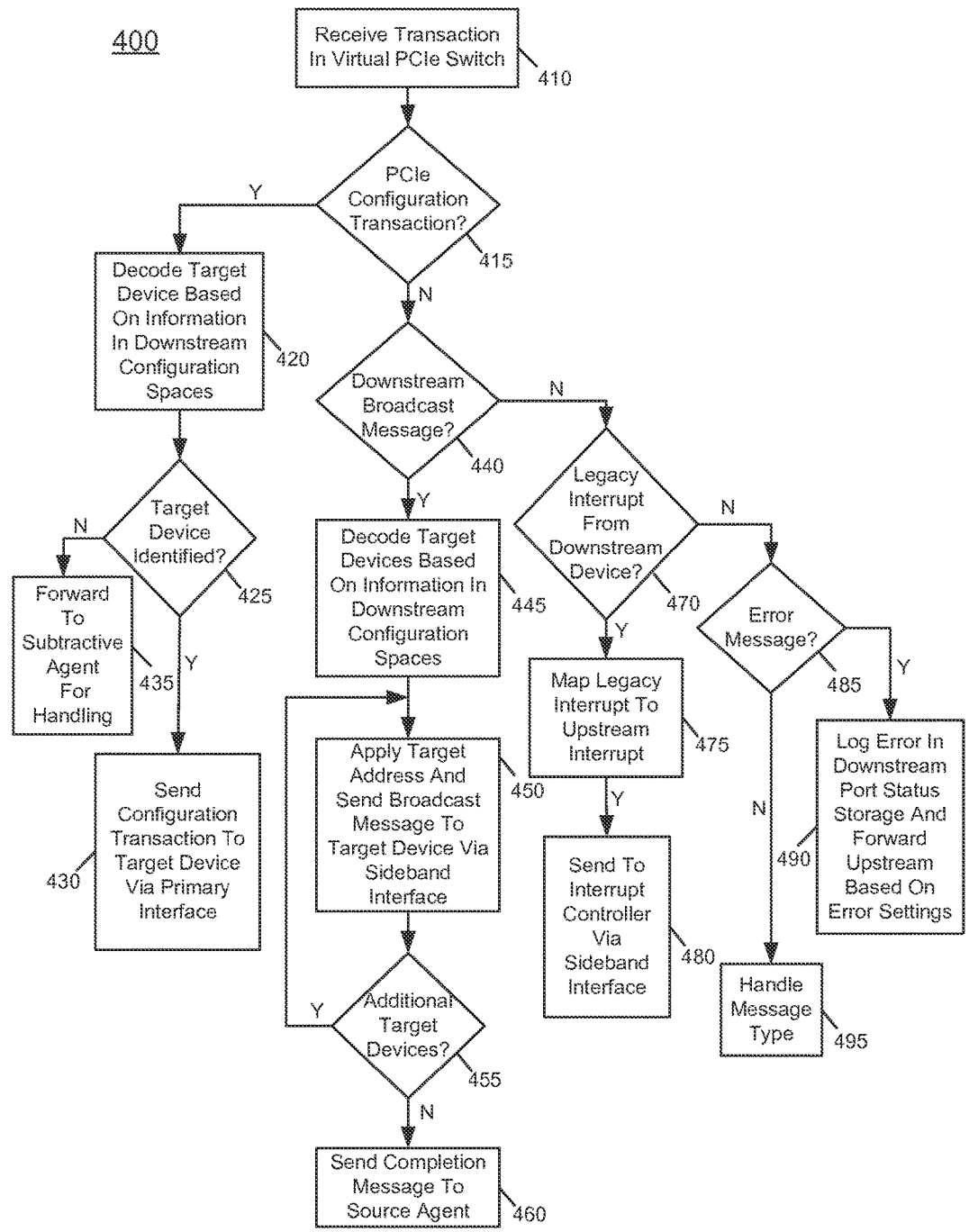
FIG. 4 is a flow diagram of a method in accordance with another embodiment of the present invention.

Referring now to FIG. 4, shown is a flow diagram of a method in accordance with another embodiment of the present invention. As shown in FIG. 4, method 400 may be performed by logic within a virtual PCIe switch to handle incoming transactions, as received from a top level fabric. As seen, method 400 begins by receiving a transaction in the virtual PCIe switch (block 410). This transaction may be received from the top level fabric via a primary interconnect coupling the top fabric and the virtual PCIe switch. Next it is determined whether the transaction is a PCIe configuration transaction (diamond 415). If so, control passes to block 420 where the target device for this transaction may be determined. More specifically, the target device can be determined based on decoding information in the transaction to identify the appropriate target device using information in downstream configuration spaces of the virtual PCIe switch. In some cases, a source decoding may occur in which the decoding information is applied by an upstream agent. Next control passes to diamond 425 where it is determined whether the target device is validly identified by way of this decoding. If so, control passes to block 430 where the configuration transaction may be forwarded to the target device via a primary interface. More specifically, as discussed above with regard to FIG. 1, the virtual PCIe switch may be coupled to various downstream agents via corresponding primary interfaces and one or more primary interconnects that couple to different levels of hierarchical fabrics coupled between the virtual PCIe switch and a given device on which the configuration transaction is directed. If instead no target device is identified, control passes to block 435 where the transaction can be forwarded to a subtractive agent for handling. In an embodiment, the subtractive agent may be implemented by way of logic within the virtual PCIe switch itself to handle subtractive operations and send an appropriate completion (if indicated).

Still with reference to FIG. 4, if the transaction is determined to not be a PCIe configuration transaction, control passes from diamond 415 to diamond 440 to determine whether the transaction is a downstream broadcast message. If so, at block 445 the message can be decoded to determine appropriate downstream target devices. This determination may be based on decoding, as described above. Thereafter at block 450 a target address may be applied and the message is sent to a target device via the sideband interface. Next it is determined whether additional target devices are indicated for the broadcast message (at diamond 455). If so, control passes back to block 450. Otherwise, upon completion of sending the broadcast message to all indicated target devices, control passes to block 460 where a completion message can be sent to the source.

With further reference to FIG. 4, if the incoming transaction is determined not to be a broadcast message, control passes to diamond 470 to determine whether the incoming message is a legacy interrupt from a downstream device. If it is determined that the transaction is a legacy interrupt, control passes to block 475 where the legacy interrupt is mapped to an upstream interrupt. Such mapping may be based at least in part on information in an interrupt mapping table of the virtual PCIe switch. Thereafter control passes to block 480 where interrupt information can be sent to an interrupt controller (such as an IO advanced programmable interrupt controller (APIC)) via a sideband interface. As such, the interrupt can be sent to the appropriate entity (e.g., a core or other logic providing a handler for the particular type of interrupt) so that the interrupt can be handled.

Still with reference to FIG. 4, if instead it is determined that the incoming transaction is not a legacy interrupt, control passes to diamond 485 to determine whether an error message is present. If so, control passes to block 490 where the error may be logged in a downstream port status storage. In addition, the error may be forwarded upstream based on error settings (if the indicated error type is not to be filtered).

If instead the transaction is not associated with an error message, control passes to block 495 where various other operations within the virtual PCIe switch to handle the message type may be performed. While shown at this high level in the embodiment of FIG. 4, many variations and alternatives are possible.

Certain transactions including memory and IO transactions are bandwidth intensive; to support maximum possible bandwidth, these transactions are routed to respective devices 150 directly from the top level fabric, without virtual PCIe switch intervention. Devices owned by virtual PCIe switch 120 (in the FIG. 2 example, devices $150_1$ and $150_6$) have non-zero bus numbers. Configuration transactions from an upstream agent (e.g., a processor core) target different devices using Bus-Device-Function identifiers. Fabric 110 does not know the bus numbers assigned to each device because the configuration space is within virtual PCIe switch 120. Hence, fabric 110 cannot directly route configuration transactions to devices owned by virtual PCIe switch 120. To enable configuration transaction routing on a primary fabric system, virtual PCIe switch 120 presents the buses owned by it to fabric 110 and the transactions targeting these buses are routed to virtual PCIe port. Virtual PCIe switch 120 uses secondary and subordinate bus numbers of downstream port configuration space to decode the target device based on bus number in the configuration transaction. After decode, the configuration transaction is sent to the corresponding device via a primary interface and primary interconnects 115.

In an embodiment, an IOSF source decode mode may be used by virtual PCIe switch 120 to forward a configuration transaction to a destination device 150. As part of target bus decode, virtual PCIe switch 120 also determines whether a particular bus number is not owned by any device. In this case, the transaction is forwarded to subtractive decode handler 230. Note that a completion for a configuration transaction sent from a device is received in virtual PCIe switch 120, which forwards the completion to fabric 110 to send to the upstream agent.

Virtual PCIe switch 120 implements ordering for configuration transactions, per device, by using buffers (such as first in first out (FIFO)) buffers within the virtual PCIe switch 120 for each device. The size of the FIFO determines the number of configuration transactions inflight per device, which may be implementation dependent. As configuration transactions are not performance intensive, the size of these buffers may be relatively small, to save die area. To comply with PCIe ordering requirements between configuration completions and interrupts generated by same device, prior interrupts are pushed up before sending a configuration completion. In an embodiment, this ordering can be achieved by making sure the downstream port of fabric 110, pushes the interrupt (if it is) first before sending a configuration completion to virtual PCIe switch 120. Note that such configuration completions and interrupts are generated by a corresponding device and are routed upstream via fabric 110.

Figure 5:
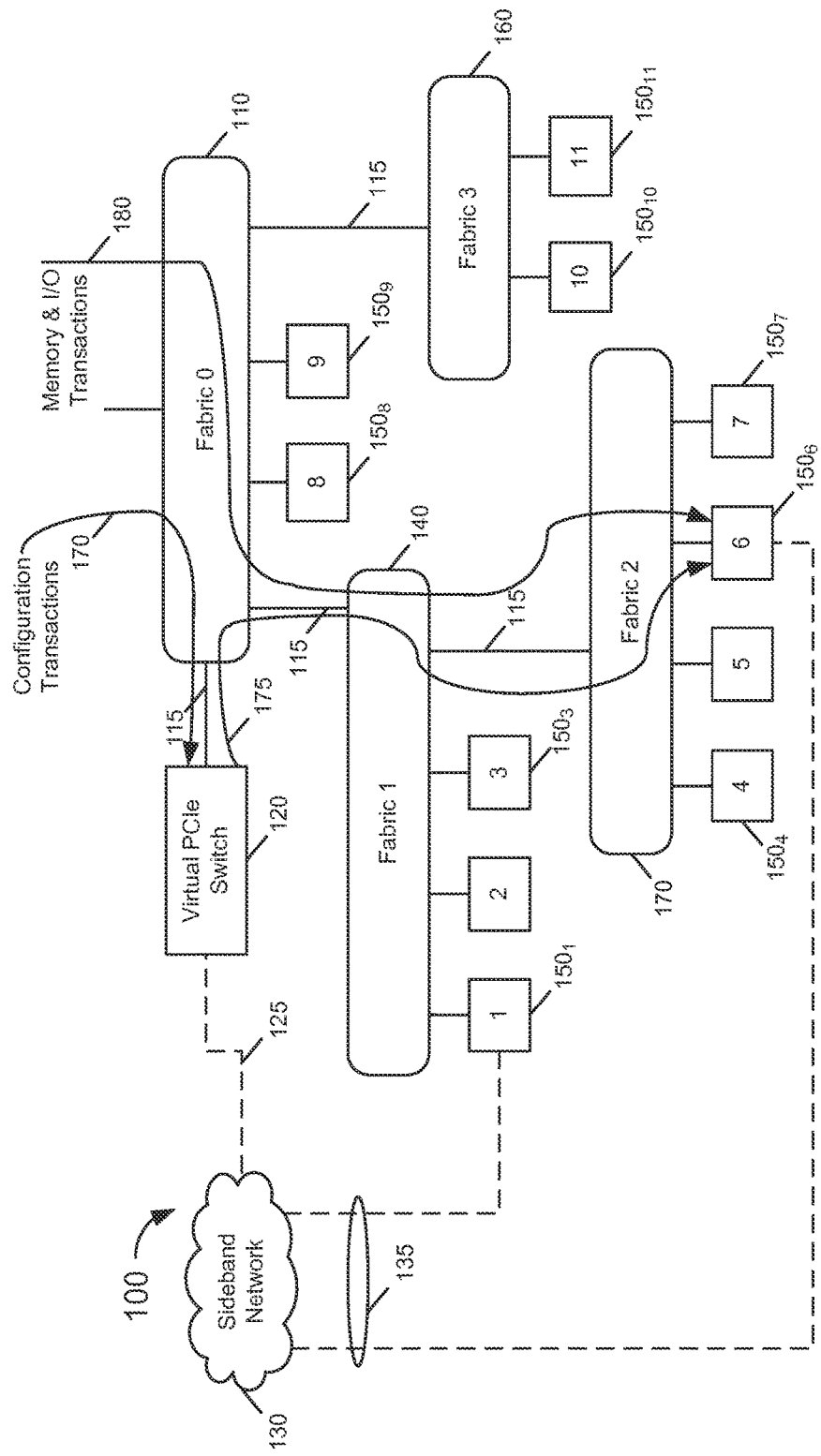
FIG. 5 is an illustration of selective routing of communications in accordance with an embodiment of the present invention.

Virtual PCIe switch 120 also routes route-by-ID message type transactions via the primary interface, similar to configuration transactions (using source decode). Message type transactions are "posted" type and thus no completion is expected from the device. Referring now to FIG. 5, shown is an illustration of selective routing of communications in accordance with an embodiment of the present invention. As shown in FIG. 5, apparatus 100 may be configured as above in FIG. 1. In the embodiment shown in FIG. 5, different transaction types are received in top level fabric 110 from an upstream agent. Specifically as seen, one or more configuration transactions are received in fabric 110, in addition to one or more other transactions 180, which in embodiments may be memory transactions and/or I/O transactions. As seen, different handling of these different transaction types may occur.

Configuration transactions 170 may be provided directly from fabric 110 to virtual PCIe switch 120 via primary interconnect 115. In turn, after performing appropriate mapping, virtual PCIe switch 120 forwards the configuration transactions to the target device (e.g., device $150_6$ in the embodiment of FIG. 5). As seen, this forwarding of the configuration transaction may be via the primary interconnects 115 coupled between virtual PCIe switch 120 and device $150_6$ (illustrated as configuration transaction flow 175). Transactions 180, to leverage enhanced bandwidth of the primary interconnect, may be routed directly from fabric 110 to the target device (e.g., device $150_6$ in the FIG. 5 embodiment).

Figure 6:
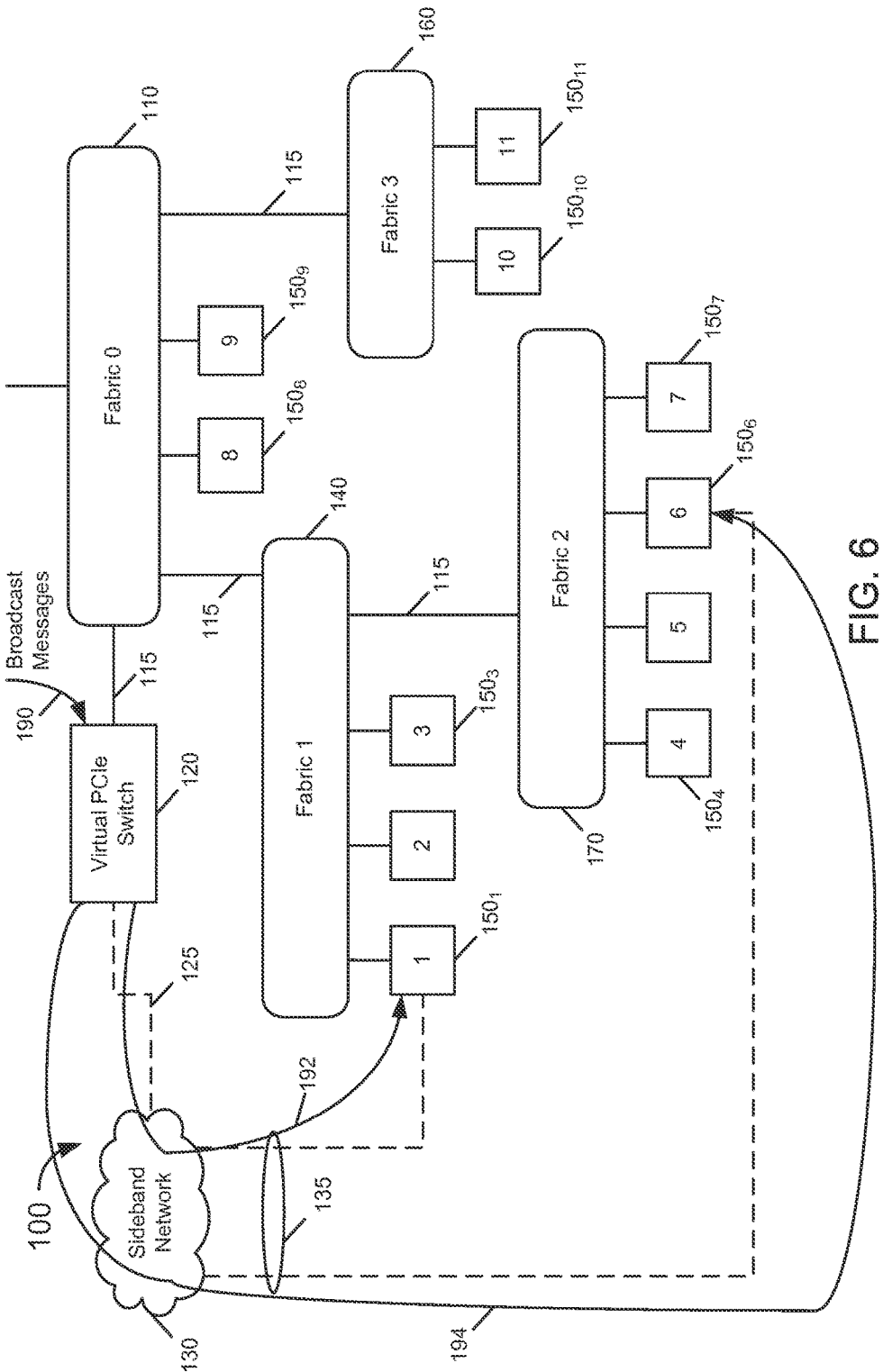
FIG. 6 is an arrangement for routing of broadcast messages in accordance with an embodiment of the present invention.

With regard to FIG. 6, illustrated is an arrangement for routing of broadcast messages in accordance with an embodiment of the present invention. As seen, incoming broadcast messages 190 may be received in virtual PCIe switch 120, either directly from a source agent (such as an upstream agent, not shown for ease of illustration in FIG. 6) or via fabric 110. In different embodiments, broadcast messages may include, but are not limited to, End of Interrupt, power management event (PME_TO), etc., to be communicated via the sideband interface. In a particular implementation, a converter may be used to convert processing unit-initiated broadcast messages into the sideband fabric. In other cases, in the absence of such module, virtual PCIe switch 120 implements similar functionality to convert broadcast messages to the sideband fabric. Here, virtual PCIe switch 120 receives broadcast messages on behalf of the switch upstream port, either from sideband or from a custom interface (if sideband conversion is handled by the virtual PCIe switch). Virtual PCIe switch 120 uses the downstream ports' configuration values to determine if a particular broadcast message can be sent to the corresponding device. Once the broadcast message is extracted, virtual PCIe switch 120 sends the message to each target device's sideband port, one at a time and completes the broadcast. After appropriate handling in virtual PCIe switch 120 (including determining a list of broadcast destinations or target devices), such broadcast messages may be sent out to the target devices via sideband interconnects 125 and 135 (through sideband network 130) as messages 192 and 194 directed to particular target devices (namely devices $150_1$ and $150_6$).

Figure 7:
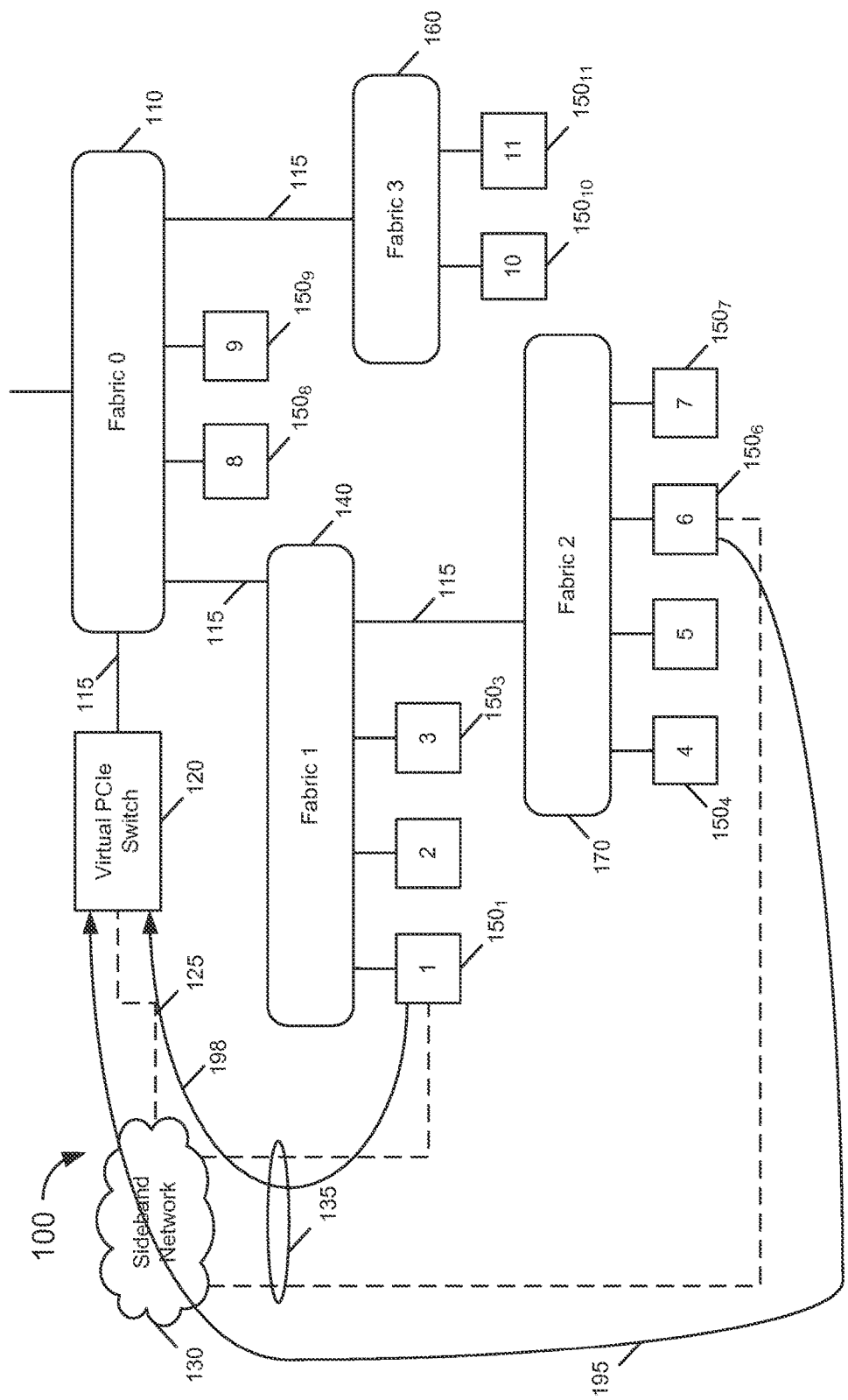
FIG. 7 is an illustration for handling interrupt messages received from downstream devices in accordance with an embodiment of the present invention.

Downstream devices 150 may further send messages upstream to virtual PCIe switch 120. In an embodiment, incoming message types can include, but are not limited to: legacy interrupts (INTx), PCIe error messages, PME_TO_ACK, etc. Referring now to FIG. 7, shown is an illustration for handling interrupt messages received from downstream devices in accordance with an embodiment of the present invention. As seen, legacy interrupt messages may be sent from downstream devices $150_1$ and $150_6$ via sideband interconnect 135, sideband network 130 and sideband interconnect 125 to virtual PCIe switch 120. After performing various processing on these incoming interrupts, information associated with these interrupts can be forwarded upstream (e.g., via fabric 110) to a given destination, e.g., a given upstream agent. Understand that while the sample flow of FIG. 7 is in the context of an INTx message, the flow is equally applicable to other messages.

Virtual PCIe switch 120 implements INTx swizzling as per PCIe switch requirements. On receiving an INTx from a particular device, swizzling logic within the switch (which may be in interrupt handler 235) accesses a mapping table to map the interrupt to a corresponding upstream INTx. Then the mapped INTx may be sent to an IO APIC via a sideband interface. Virtual PCIe switch 120 also implements Advanced Error Report (AER) as per the PCIe specification, for both upstream and downstream ports. On receiving an error message from a device on a sideband interface, virtual PCIe switch 120 logs the error in corresponding switch downstream port and escalates the error to an upstream port based on error settings.

Fabrics $110x$ can also detect errors in a transaction and on detecting an error, fabrics $110x$ can send error message to virtual PCIe switch 120. In this case, virtual PCIe switch 120 filters the error message based on the numbers it owns, for the buses it owns, logs the errors in corresponding downstream port and upstream ports. For other error messages, the error messages can be forwarded to a fabric error handling block. In different embodiments, this error handling block can be part of top fabric 110 or it can be standalone logic.

Embodiments thus achieve the highest degree of reuse of interconnect fabric and devices, by not disturbing the physical layout and still providing flexibility to add or drop secondary bus support to any device in a given design. Note that this virtual PCIe switch differs from a typical PCIe switch having inline upstream and downstream switch ports within a given fabric.

Figure 8:
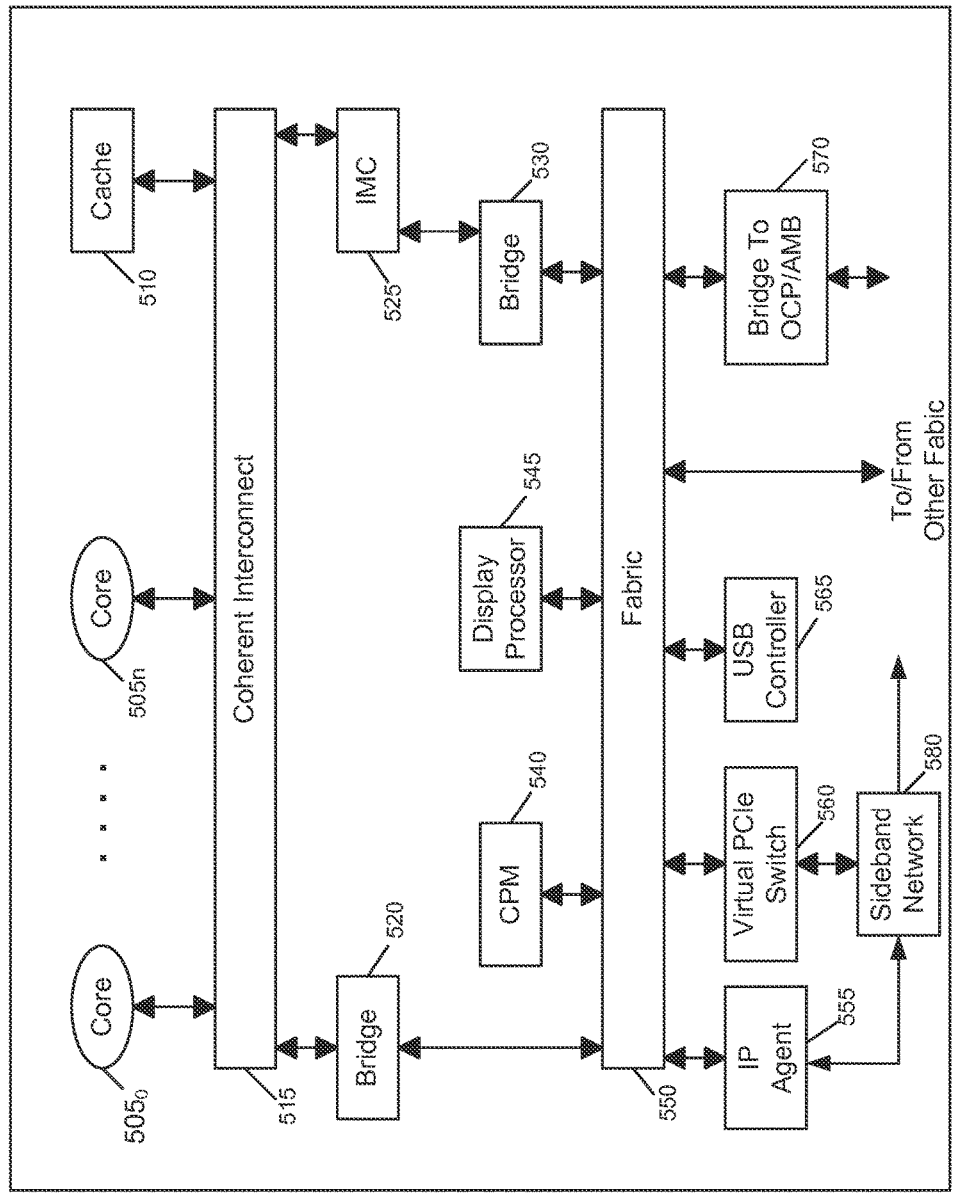
FIG. 8 is a high level block diagram of a SoC in accordance with an embodiment of the present invention.

Referring now to FIG. 8, shown is a high level block diagram of a SoC in accordance with an embodiment of the present invention. As shown in FIG. 8, SoC 500 may include various components, all of which can be integrated on a single semiconductor die to provide for various processing capabilities at high speeds and low power, consuming a comparatively small amount of real estate. As seen in FIG. 8, SoC 500 includes a plurality of cores $505_0$-$505_n$. In various embodiments, cores 505 can be relatively simple in-order cores or more complex out-of-order cores, or a combination of in-order and out-of-order cores. As seen, cores 505 can be interconnected via a coherent interconnect 515, which further couples to a cache memory 510, e.g., a shared last level cache (LLC). Although the scope of the present invention is not limited in this regard, in one embodiment coherent interconnect 515 may be in accordance with the Quick Path Interconnect (QPI)™ specification available from Intel Corporation, Santa Clara, Calif.

As further seen in FIG. 8, coherent interconnect 515 may communicate via a bridge 520 to a fabric 550, which may be an IOSF fabric. Coherent interconnect 515 may further communicate via an integrated memory controller 515 to an off-chip memory (not shown for ease of illustration the embodiment of FIG. 8), and further through bridge 530 to fabric 550.

As further seen in FIG. 8, various components can couple to fabric 550 including a content processing module (CPM) 540 which can be used for performing various operations such as security processing, cryptographic functions and so forth. In addition, a display processor 545 can be part of a media processing pipeline that renders video for an associated display.

As further seen, fabric 550 may further couple to an IP agent 555. Although only a single agent is shown for ease of illustration in the FIG. 8 embodiment, understand that multiple such agents are possible in different embodiments. A universal serial bus (USB) controller 565 can communicate with various devices according to a USB protocol. A virtual PCIe switch 560 also couples to fabric 550 and enables interconnection to a sideband network 580 that in turn may couple to a variety of agents such as IP agent 555 and other such agents coupled to other hierarchical fabrics that in turn couple to fabric 550. By way of virtual PCIe switch 560 a variety of different SoC configurations can be supported while only changing configuration of virtual PCIe switch 560 (rather than changing configurations of coupled agents, fabrics and so forth). Finally, shown in the embodiment of FIG. 8 is a bridge 570, which can be used to communicate with additional components of other protocols, such as an open core protocol (OCP) or an ARM advanced microcontroller bus architecture (AMBA) protocol. Although shown with these particular components in the embodiment of FIG. 8, understand that the scope of the present invention is not limited in this way and in different embodiments additional or different components may be present.

Figure 9:
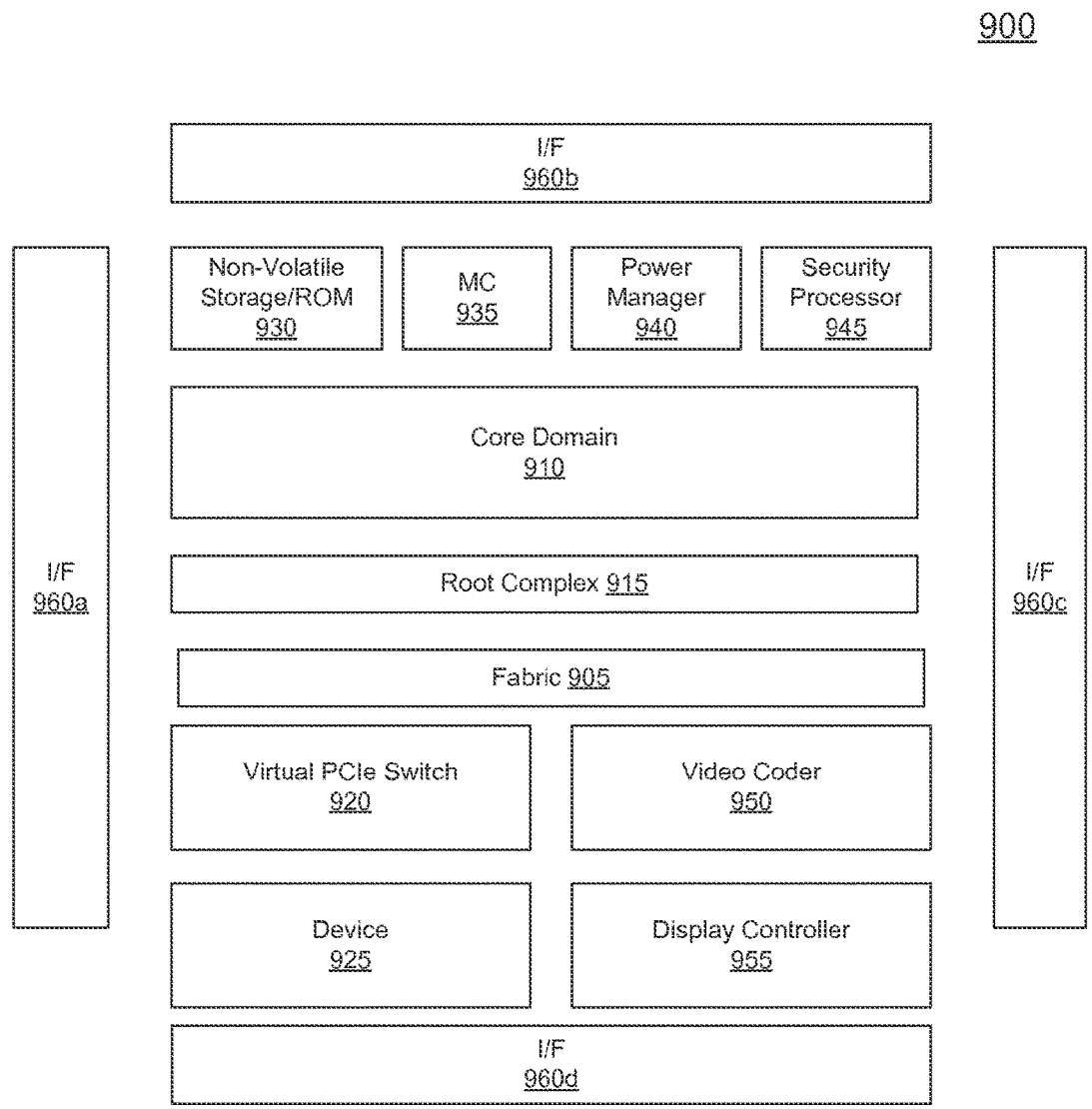
FIG. 9 is a block diagram of a system in accordance with an embodiment of the present invention.

Understand that processors or SoCs (or other integrated circuits) including integrated devices as described herein can be used in many different systems, ranging from small portable devices to high performance computing systems and networks. Referring now to FIG. 9, shown is a block diagram of a system in accordance with an embodiment of the present invention. In the embodiment of FIG. 9, system 900 may be a SoC including multiple domains, each of which may be controlled to operate at an independent operating voltage and operating frequency. As a specific illustrative example, system 900 may be an Intel® Architecture Core™-based SoC such as an i3, i5, i7 or another such processor available from Intel Corporation. However, other low power SoCs or processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer, IoT device, wearable, or other portable computing device.

In the high level view shown in FIG. 9, SoC 900 includes core domain 910 including a plurality of cores. Core domain 910 may include one or more processor cores, one or more cache memories and other circuitry. Each core of the domain may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Core domain 910 may also include an interface such as a network interface to enable interconnection to additional circuitry of the SoC. In an embodiment, core domain 910 couples to a root complex 915 and to a memory controller 935. In turn, memory controller 935 controls communications with a memory such as a DRAM (not shown for ease of illustration in FIG. 9). Root complex 915 in turn couples to a fabric 905 which in an embodiment may be a top level fabric of a hierarchical fabric system to which various devices may couple. In addition, devices 925 configured on a secondary bus may interface to a virtual PCIe switch 920 as described herein (e.g., by a sideband network) (not shown for ease of illustration in FIG. 9).

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a security processor 945 may be present to perform security operations. Each of the units may have its power consumption controlled via a power manager 940, which may include control logic to perform various power management techniques.

In some embodiments, SoC 900 may further include a non-coherent fabric coupled to the coherent fabric to which various peripheral devices may couple. One or more interfaces 960a-960d enable communication with one or more off-chip devices. Such communications may be according to a variety of communication protocols such as PCIe™, GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

Figure 10:
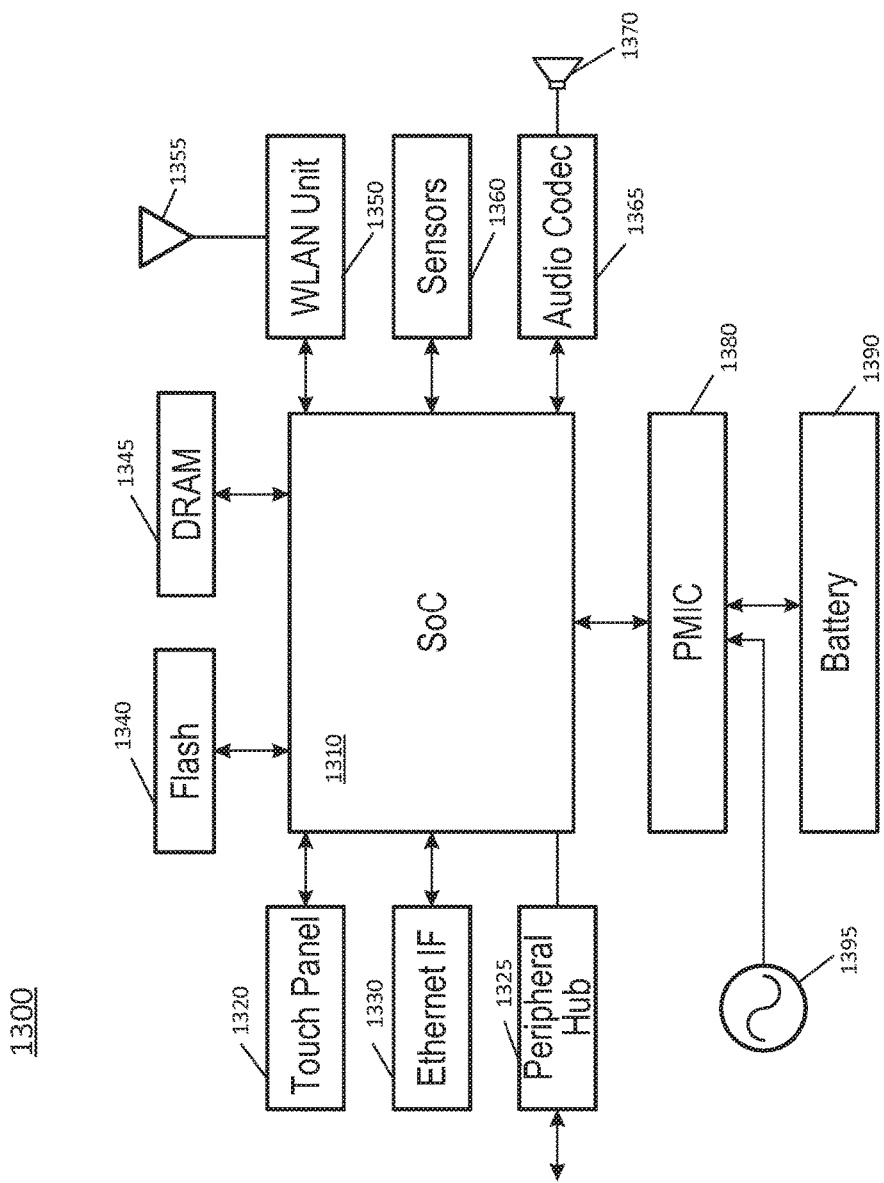
FIG. 10 is a block diagram of another example system with which embodiments may be used.

Referring now to FIG. 10, shown is a block diagram of another example system with which embodiments may be used. In the illustration of FIG. 10, system 1300 may be a mobile low-power system such as a tablet computer, 2:1 tablet, phablet or other convertible or standalone tablet system. As illustrated, a SoC 1310 is present and may be configured to operate as an application processor for the device. SoC 1310 may include an on-die interconnect architecture as described herein, including a virtual switch (e.g., a virtual PCIe switch), which may provide communication with a variety of devices to be enumerated with a secondary bus. As such, this virtual switch may be reconfigured from a base design for a particular SoC design, while fabric instantiations and IP logic instantiations may remain fixed, without customization to accommodate such secondary bus functionality.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 10, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 10, many variations and alternatives are possible.

Figure 11:
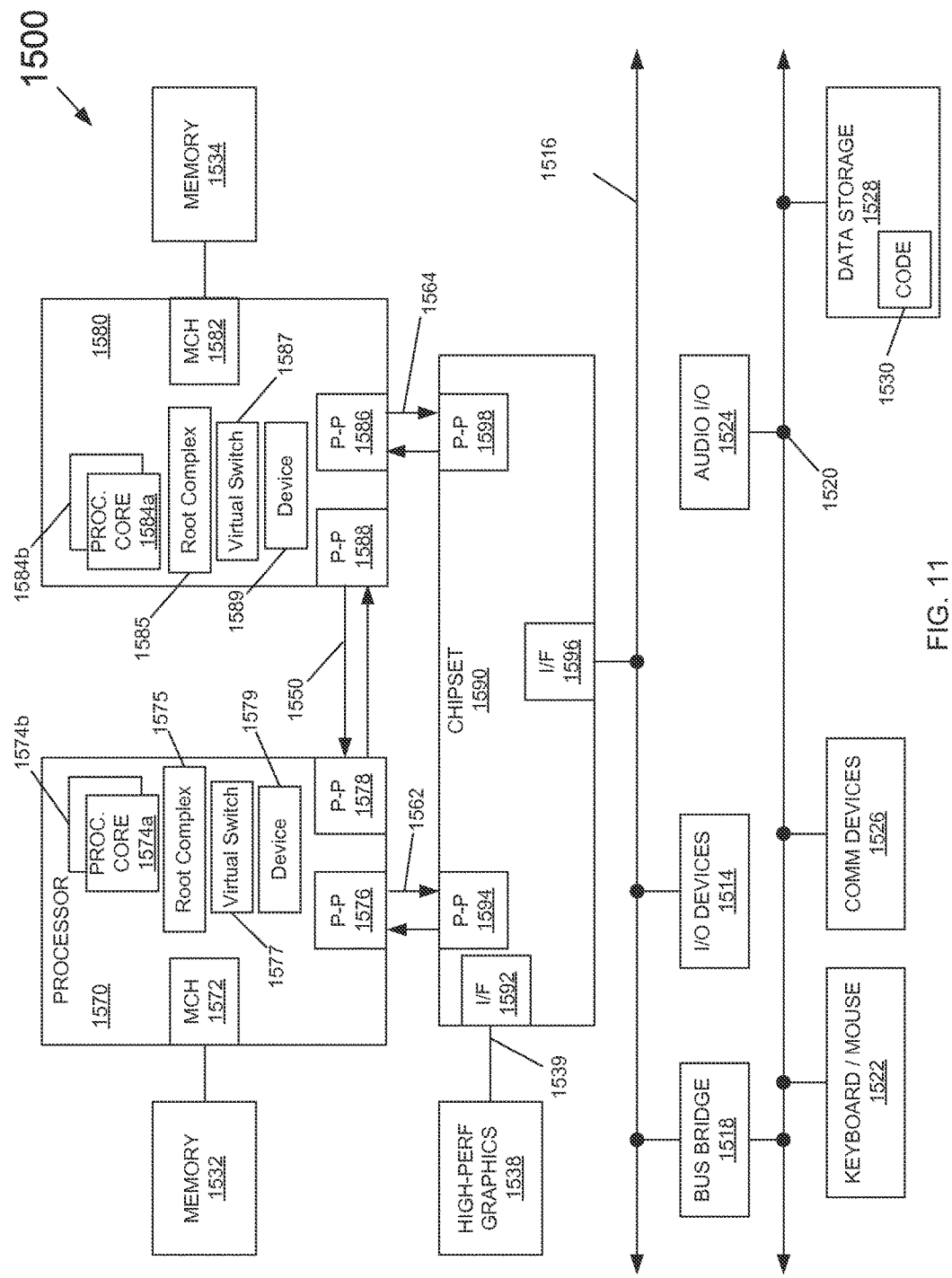
FIG. 11 is a block diagram of a system in accordance with an embodiment of the present invention.

Referring now to FIG. 11, shown is a block diagram of a system in accordance with an embodiment of the present invention. As shown in FIG. 11, multiprocessor system 1500 includes a first processor 1570 and a second processor 1580 coupled via a point-to-point interconnect 1550. As shown in FIG. 11, each of processors 1570 and 1580 may be many core processors including representative first and second processor cores (i.e., processor cores 1574a and 1574b and processor cores 1584a and 1584b). Each processor 1570 and 1580 further may include a root complex 1575 and 1585, which may couple via a top level fabric (not shown for ease of illustration in FIG. 11) to a virtual switch 1577 and 1587 as described herein to enable communication with one or more integrated devices 1579 and 1589, which may be configured for multi-function operation and enumerated with a secondary bus. In various embodiments, integrated devices 1579 and 1589 may be any desired type of special-purpose processor, accelerator, or other desired device to be integrated into the processor.

Still referring to FIG. 11, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 11, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 11, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 11, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments.

In one example, an apparatus comprises: a fabric of a first communication protocol to communicate with an upstream agent in an upstream direction and to communicate with a plurality of downstream agents in a downstream direction; a switch coupled between the fabric and at least some of the plurality of downstream agents, the switch to couple to a primary interface of the fabric via a primary interface of the switch and to communicate with the fabric via the first communication protocol, the switch further including a sideband interface to interface with a sideband fabric of the first communication protocol; and the at least some downstream agents coupled to the switch via the sideband fabric, where the at least some downstream agents are to be enumerated with a secondary bus of a second communication protocol, and the switch device is to provide a transaction received from the upstream agent to a first downstream agent based on a bus identifier of the secondary bus with which the first downstream agent is enumerated.

In an example, the switch comprises: a configuration space having an upstream space and a downstream space for the at least some downstream agents; and a configuration logic to receive a configuration transaction from the upstream agent and determine based on the downstream space the first downstream agent to receive the transaction.

In an example, the fabric is to communicate the configuration transaction to the switch via a first primary interconnect coupled between the fabric and the switch, receive a memory transaction for the first downstream agent and communicate the memory transaction to the first downstream agent via one or more secondary fabrics coupled between the fabric and the first downstream agent via a plurality of primary interconnects.

In an example, the one or more secondary fabrics include a shadow address decoder storage to store address decode information for a plurality of downstream agents coupled to the corresponding secondary fabric to enable the corresponding secondary fabric to route the memory transaction to the first downstream agent.

In an example, the switch further comprises: a subtractive decode handler to handle a transaction not directed to the at least some downstream agents; an error handler logic to receive an error message from the first downstream agent, update a status storage associated with the first downstream agent, and forward error information associated with the error message to the fabric; and a broadcast logic to receive a broadcast message from the fabric, determine target downstream agents of the at least some downstream agents to receive the broadcast message, and send the broadcast message to the target downstream agents.

In an example, the switch comprises a virtual PCIe switch.

In an example, the virtual PCIe switch comprises a reconfigurable logic to have a first configuration for a first semiconductor die including a first hierarchy of fabrics and to have a second configuration for a second semiconductor die including a second hierarchy of fabrics.

In an example, fabrics of the first hierarchy of fabrics and fabrics of the second hierarchy of fabrics have a single design.

Note that the above apparatus can be implemented as a processor using various means.

In an example, the processor comprises a SoC incorporated in a user equipment touch-enabled device.

In another example, a system comprises a display and a memory, and includes the processor of one or more of the above examples.

In another example, a method comprises: receiving a configuration transaction in a virtual switch of a processor; determining a target device of a plurality of downstream devices coupled to the virtual switch to receive the configuration transaction based on information in at least one of a plurality of downstream configuration spaces of the virtual switch; forwarding the configuration transaction to the target device via a primary interconnect coupled between the virtual switch and the target device, based on the determining; and if the configuration transaction does not target any of the plurality of downstream devices, forwarding the configuration transaction to a subtractive agent.

In an example, the method further comprises: receiving, in the virtual switch, a broadcast message; determining a list of the plurality of downstream devices to receive the broadcast message; and applying a target address for each of the plurality of downstream devices in the list to the broadcast message and sending the broadcast message to the targeted plurality of downstream devices in the list via one or more sideband interconnects coupled between the virtual switch and the corresponding downstream device.

In an example, the method further comprises after sending the broadcast message to the plurality of downstream devices in the list, sending a completion message from the virtual switch to a source agent.

In an example, the method further comprises: receiving, in the virtual switch, a legacy interrupt from a first downstream device via a sideband interconnect; mapping the legacy interrupt to an upstream interrupt; and sending the upstream interrupt to an interrupt controller coupled to the virtual switch.

In an example, the method further comprises: receiving an error message from the first downstream device; logging an error associated with the error message in a downstream port status storage associated with the first downstream device; and forwarding error information associated with the error to an upstream device coupled to the virtual switch, based on one or more error settings associated with the first downstream device.

In an example, the method further comprises: receiving, in a fabric coupled to the virtual switch, the configuration transaction from an upstream device; and routing the configuration transaction to the virtual switch via a first primary interconnect coupled between the fabric and the virtual switch.

In an example, the method further comprises: receiving, in the fabric, a memory transaction for a first downstream device from the upstream device; and forwarding the memory transaction to the first downstream device based on a shadow address mapping table associated with the fabric, via a second primary interconnect coupled between the fabric and the first downstream device.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a SoC comprises: at least one core to execute instructions; a coherent interconnect to couple the at least one core to a memory controller; a first fabric of a non-coherent interconnect system to couple to the coherent interconnect via a bridge logic, the first fabric to couple to one or more hierarchical fabrics of the non-coherent interconnect system; and a virtual PCIe switch coupled to the first fabric via a first primary interconnect and coupled to at least one downstream agent via a sideband network of the non-coherent interconnect system, where the at least one downstream agent is enumerated with a secondary bus, the secondary bus visible to the virtual PCIe switch and not visible to the first fabric.

In an example, the virtual PCIe switch is to receive a configuration transaction from the at least one core via the first fabric and provide the configuration transaction to a first downstream agent.

In an example, the first fabric is to communicate the configuration transaction to the virtual PCIe switch via the first primary interconnect, receive a memory transaction for the first downstream agent and communicate the memory transaction to the first downstream agent via at least one of the one or more hierarchical fabrics coupled between the first fabric and the first downstream agent via a plurality of primary interconnects.

In an example, the virtual PCIe switch is to receive an error message from the first downstream device, log an error associated with the error message in a port status storage of the virtual PCIe switch, and forward error information associated with the error to the at least one core via the first fabric.

In an example, the virtual PCIe switch is to receive a legacy interrupt from the first downstream device via the sideband network, map the legacy interrupt to an upstream interrupt, and send the upstream interrupt to an interrupt controller coupled to the virtual PCIe switch via the first fabric.

In an example, the virtual PCI switch comprises: a subtractive decode handler to handle a transaction not directed to the at least one downstream agent; an error handler logic to receive an error message from a first downstream agent, update a status storage associated with the first downstream agent, and forward error information associated with the error message to the first fabric; and a broadcast logic to receive a broadcast message from the first fabric, determine target downstream agents of the at least one downstream agent to receive the broadcast message, and send the broadcast message to the target downstream agents.

In an example, the first fabric and the one or more hierarchical fabrics are of a fixed design for a plurality of different SoC products, and the virtual PCIe switch is reconfigured for at least some of the different SoC products.

Understand that various combinations of the above examples are possible.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EE- PROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a fabric of a first communication protocol to communicate with an upstream agent in an upstream direction and to communicate with a plurality of downstream agents in a downstream direction;
a switch coupled between the fabric and at least some of the plurality of downstream agents, the switch to couple to a primary interface of the fabric via a primary interface of the switch and to communicate with the fabric via the first communication protocol, the switch further including a sideband interface to interface with a sideband fabric of the first communication protocol; and
the at least some downstream agents coupled to the switch via the sideband fabric, wherein the at least some downstream agents are to be enumerated with a secondary bus of a second communication protocol to support a plurality of functions, and the switch is to receive a configuration transaction received from the upstream agent via the fabric, decode the configuration transaction to be routed to a first downstream agent based on a bus identifier of the secondary bus with which the first downstream agent is enumerated, the bus identifier unknown to the fabric, and send the configuration transaction to the first downstream agent via the fabric.

2. The apparatus of claim 1, wherein the switch comprises:
a configuration space having an upstream space and a downstream space for the at least some downstream agents; and
a configuration logic to receive the configuration transaction from the upstream agent and determine based on the downstream space the first downstream agent to receive the transaction.

3. The apparatus of claim 2, wherein the fabric is to communicate the configuration transaction to the switch via a first primary interconnect coupled between the fabric and the switch, receive a memory transaction for the first downstream agent and communicate the memory transaction to the first downstream agent directly via one or more secondary fabrics coupled between the fabric and the first downstream agent via a plurality of primary interconnects, without communication with the switch.

4. The apparatus of claim 3, wherein the one or more secondary fabrics include a shadow address decoder storage to store address decode information for a plurality of downstream agents coupled to the corresponding secondary fabric to enable the corresponding secondary fabric to route the memory transaction to the first downstream agent.

5. The apparatus of claim 2, wherein the switch further comprises:
a subtractive decode handler to handle a transaction not directed to the at least some downstream agents;
an error handler logic to receive an error message from the first downstream agent, update a status storage associated with the first downstream agent, and forward error information associated with the error message to the fabric; and
a broadcast logic to receive a broadcast message from the fabric, determine target downstream agents of the at least some downstream agents to receive the broadcast message, and send the broadcast message to the target downstream agents.

6. The apparatus of claim 1, wherein the switch comprises a virtual Peripheral Component Interconnect Express (PCIe) switch.

7. The apparatus of claim 6, wherein the virtual PCIe switch comprises a reconfigurable logic to have a first configuration for a first semiconductor die including a first hierarchy of fabrics and to have a second configuration for a second semiconductor die including a second hierarchy of fabrics.

8. The apparatus of claim 7, wherein fabrics of the first hierarchy of fabrics and fabrics of the second hierarchy of fabrics have a single design.

9. A non-transitory machine-readable medium having stored thereon data, which if used by at least one machine, causes the at least one machine to fabricate at least one integrated circuit to perform a method comprising:
receiving a configuration transaction in a virtual switch of a processor from a fabric of the processor coupled to the virtual switch, the configuration transaction from an upstream device of the processor;
determining a target device of a plurality of downstream devices coupled to the virtual switch to receive the configuration transaction based on information in at least one of a plurality of downstream configuration spaces of the virtual switch based on a bus identifier of a secondary bus of a second communication protocol with which the target device is enumerated, the bus identifier unknown to the fabric, the fabric to communicate according to a first communication protocol;
forwarding the configuration transaction to the target device via the fabric and a primary interconnect coupled between the virtual switch and the target device, based on the determining; and
if the configuration transaction does not target any of the plurality of downstream devices, forwarding the configuration transaction to a subtractive agent.

10. The non-transitory machine-readable medium of claim 9, wherein the method further comprises:
receiving, in the virtual switch, a broadcast message;
determining a list of the plurality of downstream devices to receive the broadcast message; and
applying a target address for each of the plurality of downstream devices in the list to the broadcast message and sending the broadcast message to the targeted plurality of downstream devices in the list via one or more sideband interconnects coupled between the virtual switch and the corresponding downstream device.

11. The non-transitory machine-readable medium of claim 10, wherein the method further comprises after sending the broadcast message to the plurality of downstream devices in the list, sending a completion message from the virtual switch to a source agent.

12. The non-transitory machine-readable medium of claim 9, wherein the method further comprises:
receiving, in the virtual switch, a legacy interrupt from a first downstream device via a sideband interconnect;
mapping the legacy interrupt to an upstream interrupt; and
sending the upstream interrupt to an interrupt controller coupled to the virtual switch.

13. The non-transitory machine-readable medium of claim 12, wherein the method further comprises:
receiving an error message from the first downstream device;
logging an error associated with the error message in a downstream port status storage associated with the first downstream device; and
forwarding error information associated with the error to an upstream device coupled to the virtual switch, based on one or more error settings associated with the first downstream device.

14. The non-transitory machine-readable medium of claim 9, wherein the method further comprises:
receiving, in the fabric coupled to the virtual switch, the configuration transaction from the upstream device; and
routing the configuration transaction to the virtual switch via a first primary interconnect coupled between the fabric and the virtual switch.

15. The non-transitory machine-readable medium of claim 14, wherein the method further comprises:
receiving, in the fabric, a memory transaction for a first downstream device from the upstream device; and
forwarding the memory transaction to the first downstream device based on a shadow address mapping table associated with the fabric, via a second primary interconnect coupled between the fabric and the first downstream device.

16. A system on chip (SoC) comprising:
at least one core to execute instructions;
a coherent interconnect to couple the at least one core to a memory controller;
a first fabric of a non-coherent interconnect system to couple to the coherent interconnect via a bridge logic, the first fabric to couple to one or more hierarchical fabrics of the non-coherent interconnect system; and
a virtual Peripheral Component Interconnect Express (PCIe) switch coupled to the first fabric via a first primary interconnect and coupled to at least one downstream agent via a sideband network of the non-coherent interconnect system, wherein the at least one downstream agent is enumerated with a bus identifier of a secondary bus of a PCIe communication protocol to support a plurality of functions, wherein the bus identifier is unknown to the first fabric, the secondary bus visible to the virtual PCIe switch and not visible to the first fabric, wherein the virtual PCIe switch is to receive a configuration transaction from the at least one core via the first fabric, determine the at least one downstream agent of a plurality of downstream agents coupled to the virtual PCIe switch to receive the configuration transaction based on information in at least one of a plurality of downstream configuration spaces of the virtual PCIe switch based on the bus identifier, and send the configuration transaction to the first fabric to enable the first fabric to provide the configuration transaction to the at least one downstream agent.

17. The SoC of claim 16, wherein the first fabric is to communicate the configuration transaction to the virtual PCIe switch via the first primary interconnect, receive a memory transaction for the first downstream agent and communicate the memory transaction to the first downstream agent via at least one of the one or more hierarchical fabrics coupled between the first fabric and the first downstream agent via a plurality of primary interconnects without communication with the PCIe switch.

18. The SoC of claim 16, wherein the virtual PCIe switch is to receive an error message from the first downstream device, log an error associated with the error message in a port status storage of the virtual PCIe switch, and forward error information associated with the error to the at least one core via the first fabric.

19. The SoC of claim 16, wherein the virtual PCIe switch is to receive a legacy interrupt from the first downstream device via the sideband network, map the legacy interrupt to an upstream interrupt, and send the upstream interrupt to an interrupt controller coupled to the virtual PCIe switch via the first fabric.

20. The SoC of claim 16, wherein the virtual PCI switch comprises:
a subtractive decode handler to handle a transaction not directed to the at least one downstream agent;
an error handler logic to receive an error message from a first downstream agent, update a status storage associated with the first downstream agent, and forward error information associated with the error message to the first fabric; and
a broadcast logic to receive a broadcast message from the first fabric, determine target downstream agents of the at least one downstream agent to receive the broadcast message, and send the broadcast message to the target downstream agents.

21. The SoC of claim 16, wherein the first fabric and the one or more hierarchical fabrics are of a fixed design for a plurality of different SoC products, and the virtual PCIe switch is reconfigured for at least some of the different SoC products.

* * * * *